(No Model.)
R. B. WHITZEL.
HAME.
No. 279,510. Patented June 12, 1883.
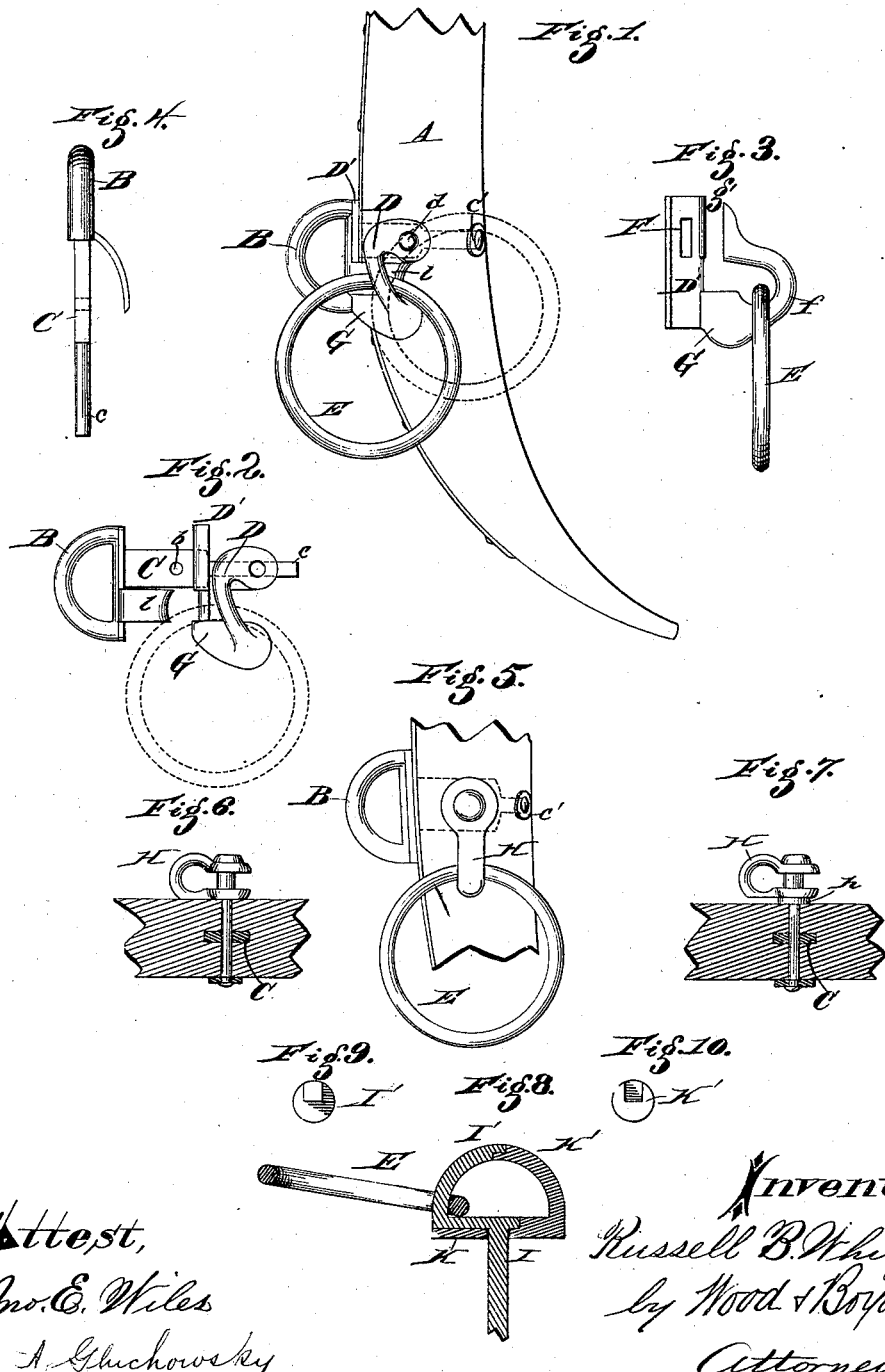
Attest,
Jno. E. Wiles
A. Gluchowsky
Inventor,
Russell B. Whitzel
by Wood & Boyd
Attorneys &c.

UNITED STATES PATENT OFFICE.

RUSSELL B. WHITZEL, OF CINCINNATI, OHIO, ASSIGNOR TO P. WILSON & SONS, OF SAME PLACE.

HAME.

SPECIFICATION forming part of Letters Patent No. 279,510, dated June 12, 1883.

Application filed April 14, 1883. (No model.)

*To all whom it may concern:*

Be it known that I, RUSSELL B. WHITZEL, a citizen of the United States, and a resident of Cincinnati, in the county of Hamilton and State of Ohio, have invented certain new and useful Improvements in Hames, of which the following is a specification.

This invention relates to improvements in draft-attachments for hames; and it consists in the combination, with a hame, of a draft-eye having a shank and an eye and ring detachably secured to the hame and shank, as will more fully hereinafter appear. Other features of the invention will be hereinafter explained and pointed out in the claims.

The invention is illustrated in the accompanying drawings, in which—

Figure 1 shows my improvement attached to the ordinary wooden hame. Fig. 2 is a skeleton view of the same detached from the hame. Fig. 3 is a modified form of staple for holding the breast-ring. Fig. 4 is an edge view of the draft-eye. Figs. 5, 6, 7, and 8 are modified forms of the breast, eye, and ring.

A represents an ordinary wooden hame-stock; B, the draft-eye.

C represents a tenon or shank, terminating in pin $c$, as shown in Fig. 2. The wide shank C fits in a mortise cut in hame-stock A, forming a strong attachment for the eye B. The pin portion $c$ projects through the hame, and is riveted over a washer, $c'$, as shown in Fig. 1.

$l$ represents a tongue-piece projecting from eye B, between the shanks of eye D; but its presence is only for filling the space, and it may be omitted.

D represents an eye for holding the breast-ring E; $d$, a pin passing through the eye D and the hole $b$ in shank C, and through the hame-stock A, the end of which is riveted down upon the inside of stock A, which secures the parts rigidly in position.

D' represents a shank, connected to eye D by a bent arm, G, so as to rest upon the inner edge of the hame A.

F represents a mortise pierced in shank D', through which passes shank C of eye D, which securely holds eye G.

Fig. 3 represents a modified form of eyebolt $f$, for holding ring E. It is secured to the hame by means of bent arm G, shank D', and mortise F, through which shank C passes without or omitting the cross-pin $d$, and the upper end is free, leaving a space, $g$, between it and hame A, so that ring E can be inserted or removed.

Figs. 5, 6, and 7 show a clevis form of eye H.

$h$, Fig. 7, represents a washer between eye H and the hame A, so as to allow clevis H to swivel, if desired.

It is desirable to have the form of eye to hold the ring E constructed so that the ring can be secured therein after it is welded. Eyes D, $f$, I', and H each secure this result.

Figs. 8, 9, and 10 show still another modification. I represents the shank of the eye, which answers to pin $d$, Fig. 1 and 2. This pin I is formed with a curved section, I', which forms one part of the eye for holding ring E, K K' representing the other section, the pin I passing through the base K, the parts being contracted, as shown. It is evident that the sections are detachable before being inserted into the hame, and ring E can be inserted and the sections I I' and K K' connected together and riveted into the hame.

When pin $d$ is used to hold eye D or its equivalent device, pin $c$ on shank C may be dispensed with; or when shank D' on bent arm G is employed, the pin $d$ might be passed through the hame, above or below the shank C; but they would not be so strong as the preferred form shown in Figs. 1, 2, or 5, 6, and 7.

I claim—

1. The combination, with the hame A, of the draft-eye B, having a shank, C, fitted to a mortise in the hame, and having a transverse opening, the eye D, carrying the ring E, and a pin connecting the eye D with the hame by passing through the opening in the shank of the draft-eye, substantially as described.

2. In combination with the hame A and eye B, having shank C, the detachable eye and ring E, secured to said hame A and shank C, substantially as herein set forth.

3. The combination of eye B, shank C, and pin c, with the eye D, and pin d, passing transversely through hame A and shank C, substantially as herein set forth.

4. In combination with the hame A, having eye B and shank C connected thereto, the detachable or open eye for holding ring E secured to the hame by a pin passing transversely through it and shank C, substantially as herein set forth.

In testimony whereof I have hereunto set my hand.

RUSSELL B. WHITZEL.

Witnesses:
JNO. E. JONES,
A. GLUCHOWSKY.